B. BODASCHER.
DEVICE FOR MAKING COFFEE, TEA, OR THE LIKE.
APPLICATION FILED SEPT. 16, 1912.
1,068,212.  Patented July 22, 1913.
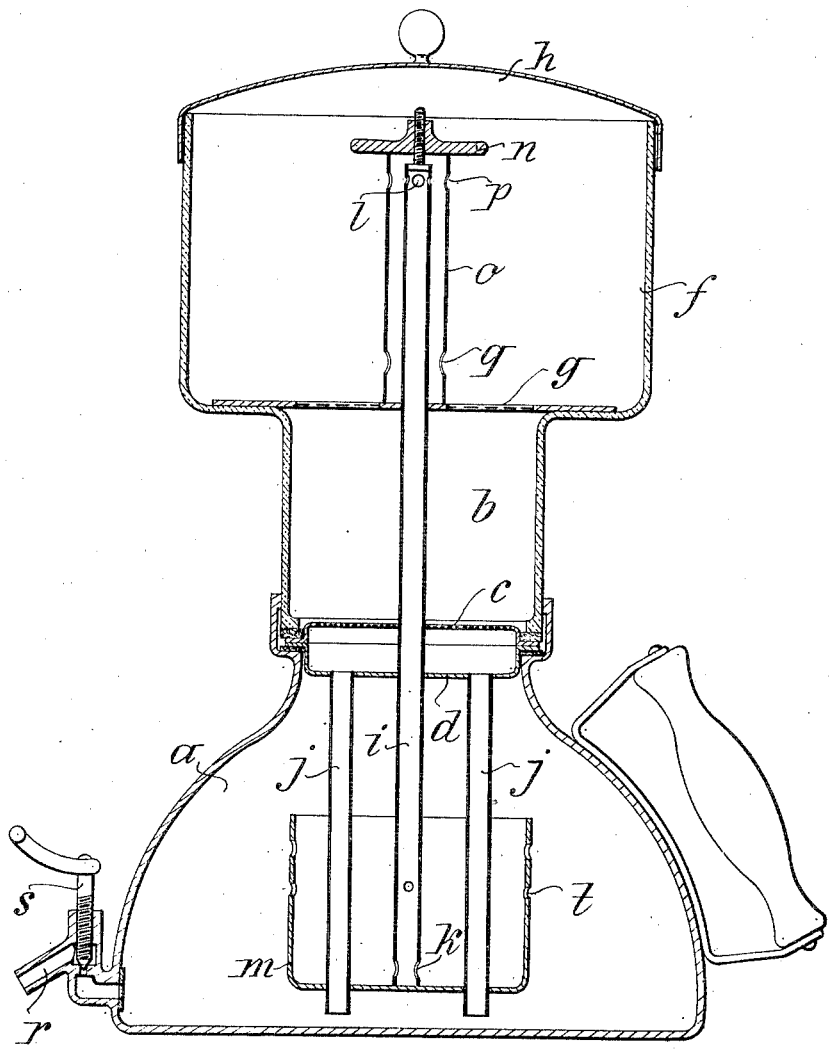
WITNESSES:
John C. Sanders
Albert F. Houman
INVENTOR
Bernhard Bodascher
BY
ATTY.

UNITED STATES PATENT OFFICE.

BERNHARD BODASCHER, OF VIENNA, AUSTRIA-HUNGARY.

DEVICE FOR MAKING COFFEE, TEA, OR THE LIKE.

1,068,212.  Specification of Letters Patent.  Patented July 22, 1913.

Application filed September 16, 1912. Serial No. 720,547.

*To all whom it may concern:*

Be it known that I, BERNHARD BODASCHER, merchant, a subject of the Emperor of Austria-Hungary, resident of Vienna, in the Empire of Austria-Hungary, (whose post-office address is No. 22 Kuefsteingasse, XIII,) have invented a certain new and useful Improvement in Devices for the Making of Coffee, Tea, or the Like, of which the following is a specification, reference being had to the accompanying drawing, forming a part thereof, in which similar letters of reference indicate corresponding parts.

This invention relates to an improvement in devices for the making or preparation of coffee, tea, or the like, consisting of three separate compartments fitting hermetically into one another and superposed one above the other, the lowest being a water-compartment, the second containing the ground coffee, tea, or the like substance, and the third serving as a collector. Into the water-compartment are lodged a number of ascending-tubes one or more of which terminate in the second-compartment, while the remainder run right through, terminating finally in the collector. At the lower ends these last-mentioned tubes are surrounded by a bowl-shaped receptacle the object of which is to retain or hold back the liquid until such time when the level of the liquid has attained the height desired in the water-compartment.

The peculiar advantage of this device above those hitherto in use, consists in the fact that, in consequence of the liquid passing repeatedly through the coffee, tea, or the like substance, this last is completely lixiviated and used up, making it possible to produce a proportionately large quantity of the beverage desired without being under the necessity drawing it off. Furthermore, a device is provided, which makes it possible to vary the quantity of the liquid destined to pass through the compartment containing the coffee, tea, or like substance.

This device consists in the peculiar arrangement of the ascending tube or tubes which run from the water-compartment right up into the collector, and which permits of their being adjusted in an altitudinal direction.

An embodiment of the improved device is illustrated by way of example in the accompanying drawing, which shows a vertical section of the same, and wherein —$a$— is the water compartment and —$b$— the compartment containing the substance to be lixiviated, the two being superposed one above the other. These two compartments are separated from each other by a sieve-bottom —$c$— slightly below which there is a solid bottom —$d$—. Compartment —$b$— is joined at its top by the collector —$f$— these two being again separated by a sieve-bottom —$g$—, the collector itself being closed by a lid —$h$—. All the joints both of the compartments as of the bottoms, must be hermetically sealed to prevent the escape of steam or the leaking of the liquid.

The device is fitted out with three ascending-tubes —$i$— and —$j$—. The ascending-tube —$i$— extends from the water-compartment —$a$— right up to almost close to the lid —$h$— of the collector —$f$—, having at each of its terminations an ingress and egress-opening —$k$—, respectively, —$l$—. To its lower termination a bowl —$m$— is attached. The other two ascending-tubes —$j$— which are likewise fitted into the water-compartment, terminate at the top in the solid bottom —$d$—, while their lower ends extend downward through the bottom of the bowl —$m$—. Tube —$i$— is supported by the pipe-support —$o$—, and is adjustable in an altitudinal direction by means of a screw-nut —$n$—. The pipe-support is fitted out with apertures —$p$— and —$q$— at either of its ends, which affords communication of the tube —$i$— with the collector —$f$—.

In order to permit the beverage to be drawn off, a spout —$r$— is provided, which may be closed by means of a valve —$s$—.

In order to prepare the tea, coffee, or the like, the compartment —$a$— is supplied with water, whereupon it is heated. The steam produced, forces the water up through the three ascending tubes, so that a small proportion of the water enters, by means of tube —$i$— and the apertures —$l$— and —$q$—, straight into the collector, while the main portion of the water is forced through tubes —$j$— into the compartment —$b$—, where it already partially effects the work of lixiviating the coffee, tea, or like substance, after which it likewise ascends into the collector —$f$—. This process lasts for such a length of time, until the water-level sinks below the apertures —$k$— of tube —$i$—. When the water has attained this level, steam enters through the apertures —k— of tube —i— into the compartment —f— thereby causing an equalization of the pressure between this compartment and the water-compartment —a—. As a result the liquid contained in the upper part of the device may descend again, which it does, and after once again lixiviating the substance contained in compartment —b—, finally returns into compartment —a— by means of tubes —j—. The return of the liquid causes the water-level to rise to the brim of the bowl —m—, or, if its sides are provided with apertures —t—, up to the height of these. By these means the bowl is re-filled and the apertures —k— are covered up, so that the steam ceases to flow in through tube —i—. This action of the apparatus shows that the bowl m has for its purpose to bring about an intermittent flow of liquid into a, inasmuch as the liquid passing down through the tubes j is prevented from reaching the openings k until the level of the liquid has again attained the height of the openings t. Only at this point is the passage of steam into the collector and the back flow of the liquid consequently interrupted.

In order to vary the quantity of the liquid which is to be forced through the compartment —b— an adjuster is provided for tube —i—. That is, the higher the apertures —k— are placed above the bottom of compartment —a—, the sooner the steam begins to enter into the collector, and the liquid to return; whereby it follows that the strength of the beverage may be varied at will.

The object of the bottom —d— is to enable the water to cover the whole surface of compartment —b— uniformly and equally.

Having thus described my invention, what I claim as new, and desire to secure by Letters Patent is:

1. In a device for making coffee and the like, in combination, a liquid compartment, a compartment adapted to contain the material to be treated, a collector, a tube communicating with said second compartment and with said liquid compartment, a tube communicating with said collector and extending into said liquid compartment, said tube being provided with an opening in each of its ends, and a bowl positioned within said liquid compartment and within which the end of said second mentioned tube terminates.

2. In a device for making coffee and the like, in combination, a liquid compartment, a compartment adapted to contain the material to be treated, a collector, a tube communicating with said second compartment and with said liquid compartment, a tube communicating with said collector and extending into said liquid compartment, said tube being provided with an opening in each of its ends, and a bowl positioned within said liquid compartment and within which the end of said second mentioned tube terminates, said second mentioned tube and said bowl being adjustable.

In testimony whereof I have affixed my signature to the foregoing specification in the presence of two witnesses.

BERNHARD BODASCHER.

Witnesses:
 ARTHUR LINDENSTEAD,
 AUGUST FUGGER.